United States Patent [19]

Myer

[11] Patent Number: 4,793,198

[45] Date of Patent: Dec. 27, 1988

[54] FLUID FLOW MOTION REDUCTION SYSTEM

[75] Inventor: Jon H. Myer, Woodland Hills, Calif.

[73] Assignee: Hughes Aircraft Company, Los Angeles, Calif.

[21] Appl. No.: 56,216

[22] Filed: May 29, 1987

[51] Int. Cl.[4] .......................... F16H 21/44; G05G 9/00

[52] U.S. Cl. .................................. 74/110; 74/471 XY

[58] Field of Search .................. 74/471 XY, 110, 1 R; 33/491, 23.01, 23.03

[56] References Cited

U.S. PATENT DOCUMENTS

| | | | |
|---|---|---|---|
| 2,640,428 | 6/1953 | Houghton | 74/440 |
| 2,724,980 | 11/1955 | Russell | 74/471 XX |
| 3,149,510 | 9/1964 | Kulicke | 74/471 XY |
| 3,463,579 | 8/1969 | Papritz | 74/471 XY |
| 3,703,833 | 11/1972 | Olah | 74/110 |
| 4,700,584 | 10/1987 | Narishige et al. | 74/471 XY |

*Primary Examiner*—Lawrence Staab

*Attorney, Agent, or Firm*—V. D. Duraiswamy; A. W. Karambelas

[57] ABSTRACT

A fluid flow motion reduction apparatus capable of a very small and reduced movement in one and two dimensions. The motion reduction apparatus applies the principles of Couette flow to a set of stacked plates, the plates being separated from one another by a Newtonian fluid. In the preferred embodiment, a top plate moves causing the fluid upon which it resides to flow. This fluid presses against an interleaved driven plate, which imparts a force on a lower fluid of greater viscosity than the top plate fluid. The resulting linear displacement of the driven plate is substantially reduced when compared to the distance traversed by the top plate, thus resulting in substantial motion reduction.

An alternative embodiment discloses a joystick-driven, two dimensional motion reduction apparatus having a joystick with a double ball bearing assembly at one end seated in a conical aperture of the top plate. This embodiment is capable of both X and Y axis motion. The double ball bearing assembly is seated in a ball socket formed by the plates and may be locked into place by an adjustable screw.

8 Claims, 3 Drawing Sheets

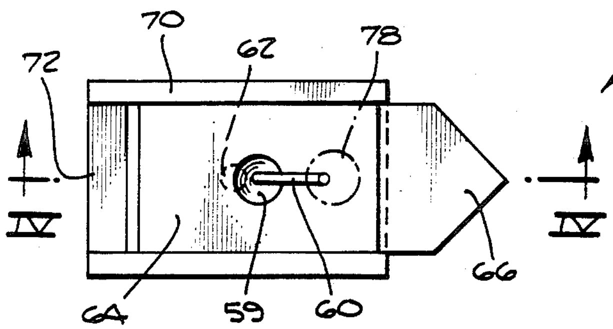
Fig. 3.
Fig. 4.
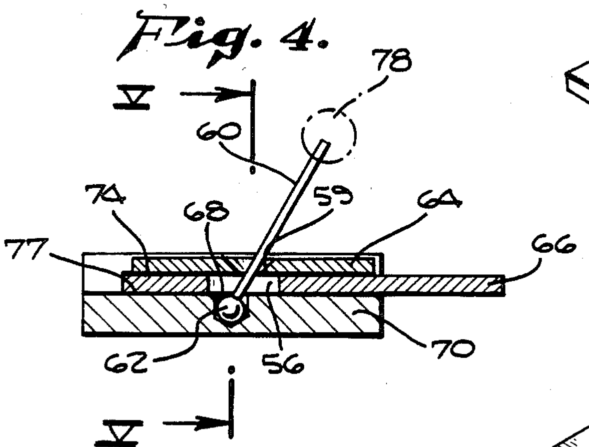
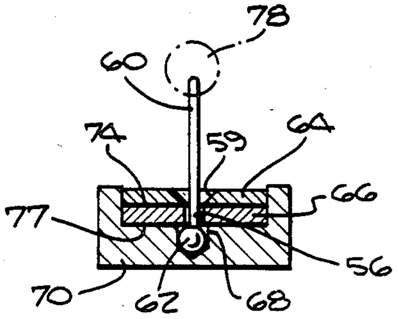
Fig. 5.
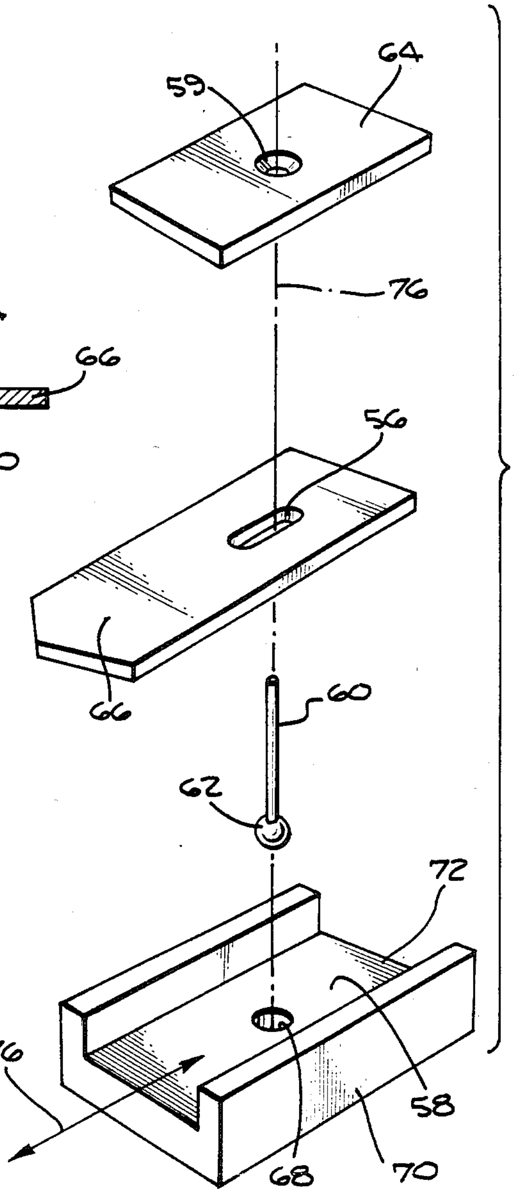
Fig. 6.

FLUID FLOW MOTION REDUCTION SYSTEM

FIELD OF THE INVENTION

This invention relates to linear displacement mechanisms, and more particularly, to a linear displacement mechanism which uses the principles of fluid flow motion reduction to achieve minute linear displacements.

BACKGROUND OF THE INVENTION

Precise and accurate optical, electronic, and mechanical devices require a simple, low cost and backlash-free linear or rotational motion reduction system. In the conventional art of motion reduction mechanisms, such as those employed in micropositioners and micromanipulators, large reductions in displacement often bring about large increases in applied force. However, the application of large forces are often unnecessary and even undesirable because they can deform and damage delicate objects. Where motion reduction is required, such as those mechanisms where a significant linear displacement needs to be translated (to a proportional but substantially smaller linear displacement,) but precise positional locations are not absolutely required, heretofore alternative mechanisms to the standard gears and screws found in small displacement mechanisms such as micrometers have not always met optimum requirements.

What is needed is a method of motion reduction wherein the motion reduction system provides for proportional reduction in linear displacement without the introduction of large increases in applied force.

SUMMARY OF THE INVENTION

The present invention is directed to a fluid flow motion reduction apparatus and system wherein the principles of hydraulic phenomenon of planar Couette flow and flow of viscous Newtonian fluids are applied. Couette flow may be defined as the low-speed, steady motion of a viscous fluid between two infinite plates moving parallel to each other. "Couette flow" is a two dimensional flow, without a pressure gradient in the directionn of flow, caused by relative tangential movement of the boundary surfaces of the fluid. A "Newtonian fluid" is a fluid in which the state of stress at any point is proportional to the time rate of strain at that point; the proportionately factor is the viscosity coefficient. Newtonian fluids exhibit the Couette flow phenomenon. In particular, a set of at least three parallel flat plate members, including a top movable driving plate member, a stationary bottom plate member and an interleaved center driven plate member positioned between the top and bottom plate members are placed in parallel adjustable position and separated by two separate fluids. The first fluid is positioned between the top driving plate member and the interleaved plate member. The second fluid is positioned between the interleaved driven plate member and the bottom stationary plate member. The second fluid in the preferred embodiment is a fluid chosen to deliberately be a higher known viscosity than that of the first fluid. The distances between each set of plates in the preferred embodiment are equal. The plates may be securely separated in a relatively frictionless manner by plurality of steel balls. When force is imparted along one direction to the upper driving plate, the interleaved driven plate moves a reduced distance which is calculable and proportional to the movement in the to plate member and the ratio of the viscosities of the fluids. The ratio of the distance that the driven plate moves to the distance that the driving plate member moves, is a ratio proportional to the viscosity of the first fluid to the second fluid.

As an alternative embodiment, the fluids positioned between each of the plates may be of the same viscosity, but the spacing between the top and center driven plate may be made to be substantially greater than the spacing between the central driven plate and the lower stationary plate since the flow of the fluids is a function of the spacing between the plates as well as the viscosity. When the viscosity of both first and second fluids is the same or when the same fluid is used as first and second fluids, the relative thickness or distance between the pairs of plates provides a relationship in which the distance moved by the driving top plate to the distance moved by the driven plate is proportional to the ratio of the spacing between the driven plate and the stationary plate to the spacing between the driven plate and the driving plate.

A bidirectional, one-dimensional Couette flow apparatus is disclosed which is actuated by a joystick to allow the joystick to move a top driver plate and through a viscous fluid an interleaved driven plate within a channel, whereby the joystick is secured to a socket within a lower stationary housing. As the joystick is moved within the socket, the top driver plate moves a greater distance than the interleaved driven plate since the grease or fluid layer between the driven and driver plates is selected to have a lower viscosity than the fluid layer between the housing channel and the driven plate. In this manner, the driven plate may be moved infinitesimal distances even though the top driver plate is moved through greater distances. The distance transversed by the driven plate is a function of the planar Couette flow phenomenon because of the difference in viscosities of the two layers of grease or fluid which lie above and below the driven plate.

Additionally, a two-dimensional embodiment of the invention is disclosed which includes a joystick capable of two-dimensional X–Y axis movement mounted on to a set of at least three plates separated, layer by layer, by a first fluid of uniform viscosity and a lower plate having a second fluid of substantially greater viscosity. As the joystick of this alternative embodiment is moved in either X–Y direction or diagonally, the driven plate is caused to move a substantially smaller distance than a drive plate.

BRIEF DESCRIPTION OF THE DRAWINGS

FIG. 3 is a top view of a bidirectional one dimensional linear displacement Couette flow apparatus operating according to the principles of this invention.

FIG. 4 is a cross-sectional view of the linear displacement Couette flow apparatus taken along line IV—IV of FIG. 3.

FIG. 5 is a cross-sectional view of the linear displacement Couette flow apparatus taken along line V—V of FIG. 4.

FIG. 6 is an exploded view of the linear displacement Couette flow apparatus of FIG. 3 showing the manner in which the apparatus is assembled.

DETAILED DESCRIPTION OF THE PREFERRED EMBODIMENT

Figure 1:
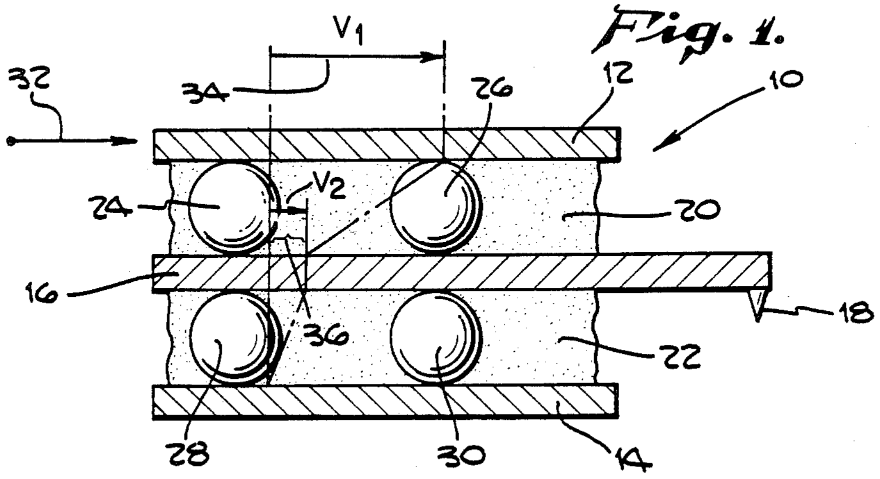
FIG. 1 shows a cross-sectional Diagrammatic profile of the preferred embodiment of the fluid flow motion reduction apparatus of this invention.

With reference to FIG. 1, the fluid flow motion reduction apparatus 10 which is the subject of this invention and capable of movement in a single linear dimension includes a moveable top driving plate 12 and a stationary bottom plate 14. Positioned between these plates is an interleaved driven plate 16. The driven plate 16 may have protruding from one end a probe or attachment means 18 which may be used to indicate the change of position in the driven plate 16 during operation of the fluid motion reduction system of this invention. Positioned and contained between the top driving plate 12 and the interleaved driver plate 16 is a first low viscosity driver fluid 20 (such as the low viscosity grease sold under the trademark *Apiezon* "N") and positioned and contained between the interleaved of driven plates 16 and the stationary bottom plate 14 is a second high viscosity fluid 22 (such as the high viscosity grease sold under the trademark *Rocol Kilopoise* 0868G). In order to securely separate plates 12 from plate 16 and plate 14 from plate 16, steel balls 24, 26, 28 and 30 may be interpositioned between each set of plates to provide a relatively frictionless contact between each of the respective fluids in each set of plates and maintain the spacing between them.

In operation, when the top driving plate 12 moves at a uniform velocity, in lateral direction 32, the velocity at which the plate travels in symbolically pictured as vector ($V_1$) 34. Since the upper fluid 20 is a relatively low viscosity fluid, the upper driving plate 12 will move substantially farther distance 34 than the distance 36 that the driven plate 16 will move. The distance 36 that the driven plate 16 will move is directly proportional to the ratio between the viscosities of the upper fluid and lower fluid. In other words, the ratio between the distance 34 moved by the upper driving plate 12 and the distance 36 moved by the lower driven plate 16, is in turn proportional to the ratio between the low viscosity of the upper driver fluid 20 to the high viscosity fluid 22. This result is apparent if one takes into account the nature of Couette flow or the laminar flow of a Newtonian fluid. Each of the fluids 20 and 22 have been described as Newtonian in that their viscosities are uniform and proportionally linear over the operational ranges contemplated for the invention's application. It is therefore required that fluids 20 and 22 be Newtonian fluids which by definition obey the following equation:

$$D=\mu(VL/d)$$

where

D = the drag force per unit width of the moving plate;

d = the spacing between the moving and stationary plates;

V is the velocity of the moving plate;

L is the length of the plates;

$\mu$ is the viscosity of the fluid.

The above Newtonian fluid equation which describes Couette flow is applicable when two different fluids are employed, such as in the preferred embodiment, and the spacing between the plates are kept equal, the relative movements between the top driving plate 12 and the driven plate 16 will be in direct proportion to the ratio of the viscosities of the fluids. Although uniform velocity displacement fields are shown by vector 34 and distance 36, it is understood that initially a force must be applied to the upper fluid 20 by means of movement of the top driving plate 12 in the lateral direction 32. Once uniform movement is achieved, the upper driving plate 12 will move a distance proportionally greater than the driven plate 16 in the same ratio. Fluids 20 and 22 exhibit a linear relationship with reference to their respective viscosities. When the above equation is solved for each fluid in the preferred embodiment, all the variables drop out of the equation leaving a ratio of viscosities. This ratio of viscosities accounts for the difference in vector displacement profiles of various layers of fluid in each of the fluid mediums 20 and 22.

Figure 2:
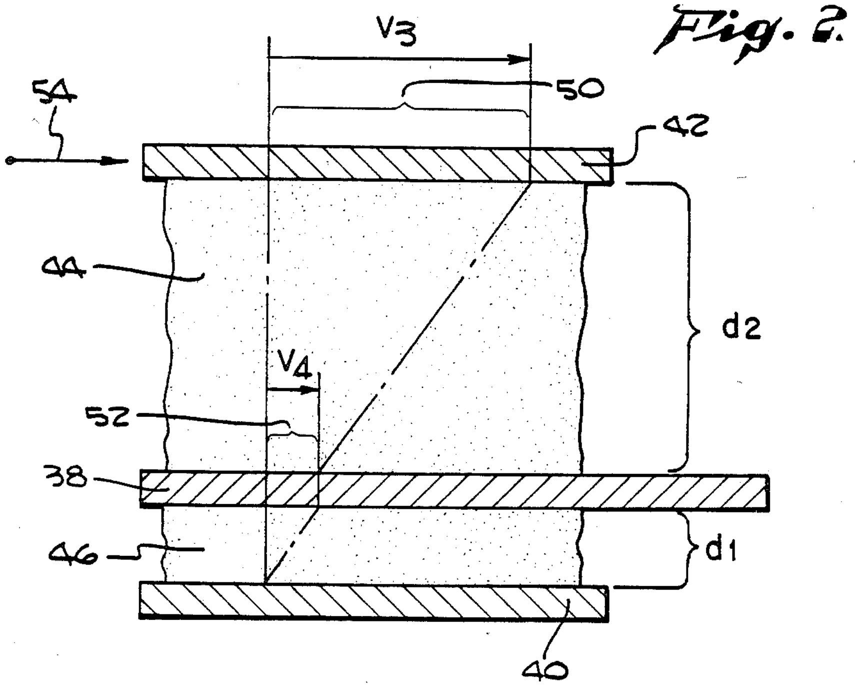
FIG. 2 shows an alternative embodiment and diagrammatic profile of the fluid flow motion reduction apparatus of this invention.

Turning now to FIG. 2, there is disclosed a set of plates including top driving plate 42, stationary bottom plate 40, and a driven plate 38. As in the preferred embodiment, each set of plates defines a boundary region for each of the two separate fluids. In this embodiment, however, the viscosities of the fluids contained between each of the sets of plates are equal. In the alternative, the same fluid may occupy each of the two compartments between the sets of plates. In either case, as the top plate 42 is moved, the driven plate 38 moves a proportionately smaller spacing as shown at 50 and 52 of FIG. 2. As discussed previously, one of the variables that accounts for Newtonian fluid flow is the spacing between the plates. When the viscosities of fluids 44 and 46 are identical, but the spacing between the plates 42, 38, and 40 differ, so that fluid 44 occupies a greater vertical spacing $d_2$ than the space $d_1$ which the fluid 46 occupies, the resulting movement of plate 38 will be substantially smaller, in a lateral direction 54, than the movement of the top plate 42. In this alternative embodiment, it is clear that the difference in spacing between the plates is the factor which determines the ratio of the distance moved by the top plate 42 to the distance moved by driven plate 38.

In either embodiment, there is disclosed a system which allows a reduction in motion and displacement in one linear direction with substantially little or no force applied. The laminar nature of the Newtonian fluids allow the Couette flow effect to direct uniform movement and proportional reduction of movement of the driven plate with a minimum application of force.

Referring now to FIGS. 3-6, a bidirectional unidimensional Couette flow apparatus is shown which operates according to the principles herein, above set forth regarding the Couette flow phenomenon exhibited by Newtonian fluids. With particular reference to FIGS. 3 and 6, this particular linear displacement apparatus is mounted within a fixed housing 70. The stationary housing 70 defines a U-shaped channel 72 on its upper surface 58 and has a socket aperture 68 centrally positioned within the channel 72. A joystick 60 bears a pivot ball 62 on one end which fits into the socket aperture 68 of the channel 72.

Assembled directly on top of the upper surface 58 of the housing 70, positioned for bidirectional movement along the central axis 76, is the interleaved driven plate 66 having an elongated slot 56. On top of the driven plate 66 is the driver plate 64 with a frustoconical countersink bore 59. The joystick 60 passes through the slot 56 and the bore 59, and may be fitted with a handle 78 for grasping the joystick 60.

With additional reference to FIGS. 4 and 5, the operation of the unidimensional Couette flow apparatus is illustrated. The handle 78 of joystick 60 is grasped and pivoted back and forth along central axis 76 (FIG. 6), between the driving plate 64 and the interleaved driven plate 66 is a layer of relatively low viscosity Newtonian fluid 74 (preferably a grease to avoid escaping and loss of lubricant). Movement of the driving plate 64 will cause movement of the driven plate 66. However, driven plate 66 has an under-coating of a high viscosity grease 77, contained between the driven plate and the housing 70, so that as motion of the driver plate 64 gives rise to motion of the driven plate 66, the distance traversed by the driven plate 66 will be substantially less than the axial distance traversed by plate 64 as a result of the drag effect of the high viscosity grease. In this manner motion reduction may be achieved, due to the difference in viscosities of the fluids 74 and 77 and the Couette flow effect. Use of a pivot ball 62 and socket 68 reduces any frictional drag that the arm 60 may exhibit, so that the Couette flow effect may be maximized and a linear motion reduction may be achieved which is substantially a function of the viscosities of the fluids ratio.

A top perspective view, two cross-sectional views, and a two dimensional embodiment of a Couette flow motion reduction apparatus (FIGS. 7–10), together, show a joystick 80 which is supported by a double bearing assembly 82 having an upper contact sphere 84 integral with the lower contact sphere 86. The double bearing assembly 82 (integral with the joystick 80) forms a lubricated lever allowing 360° freedom of movement of the joystick around circular path 88 (FIGS. 8 and 9).

Into the stationary upper housing plate 90, a conical aperture 92 is formed in the preferred embodiment. The upper housing plate serves as a retainer for the driver plate 100 which contains an aperture for the double bearing assembly 82 which operates as a ball joint. Fluid layer 94 is of a viscosity equal to fluid layer 96, so that as the joystick 80 is moved in either an X or Y direction, (or diagonally to these axes) both contact spheres 84 and 86 will be continually lubricated by the same fluid. A counter sink bore 98 is sculptured into movable circular driver plate 100, so that as the joystick 80 is rotated or swivelled, the circular driver plate 100 causes movement of the driven plate 104. By means of the Couette flow principles, the fluid layer 106, (being a higher viscosity fluid than fluid layers 94 and 96) when interacting with driven plate 104, causes reduced displacement of the plate 104. A lower housing 108 remains stationary supporting the whole assembly. An adjusting screw 110 is used to lock the lower ball of the double bearing assembly into the stationary housing, preventing the unintended uplifting or movement of assembly 82.

Figure 7:
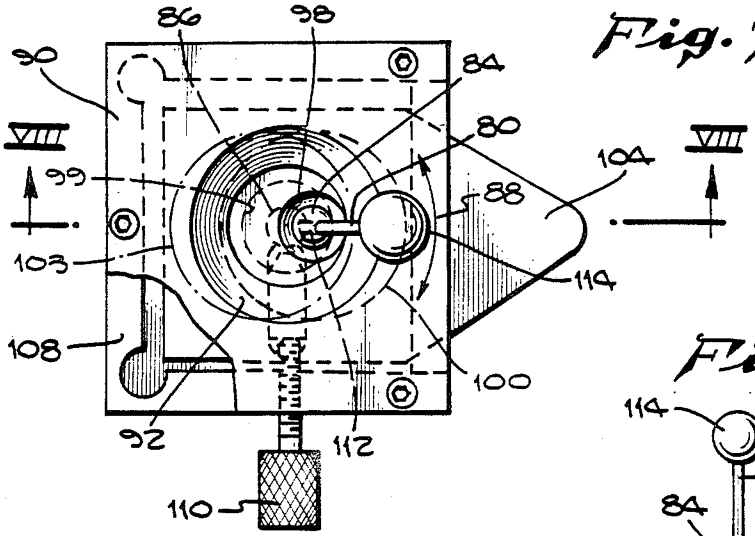
FIG. 7 shows a top perspective view of two dimensional embodiment of the fluid flow motion reduction apparatus of this invention.
Figure 10:
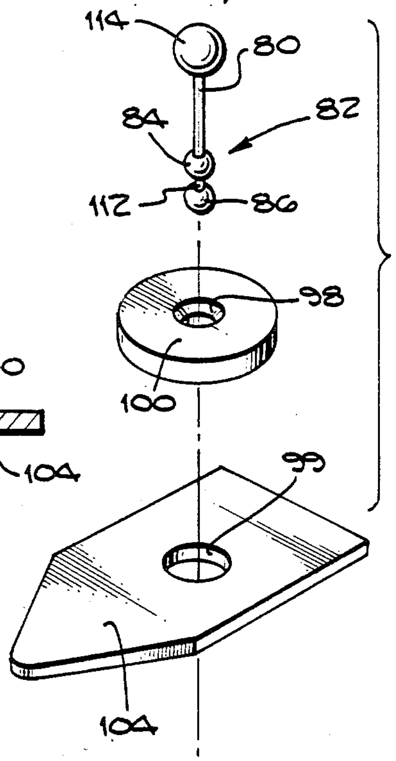
FIG. 10 is an exploded view of the two dimensional embodiment of this invention emphasizing the assembly of the movable components of this embodiment.

With particular reference to FIGS. 7 and 10, the movable parts of the two dimensional Couette flow apparatus are shown in an exploded assembly configuration at FIG. 10. The driven plate 104 has a large central hole 99 which may be positioned in line with the counter sink bore 98 of the circular driver plate 100 in order to insert the joystick 80 therethrough. The bore 98 is substantially smaller in diameter than the hole 99 of the driven plate 104, and matches the diameter of sphere 84 so that the circular driver plate 100 has a wide range of movement available, as shown by the alternate broken circular paths 103 of FIG. 7. As the plate 100 moves over the range of paths 103, the contact sphere 84 may move all along the inner circumference of the circular path defined by hole 99 (see FIG. 7). The assembly configuration of Figure 10 additionally reveals that the double bearing assembly 82 has a short length 112 of the joystick 80 which separates the contact spheres 84 and 86, allowing the freedom of range of movement within hole 99 which the joystick 80 enjoys.

Figure 8:
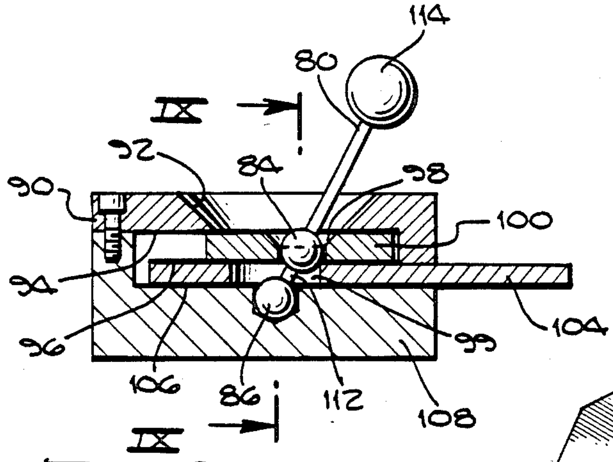
FIG. 8 shows a cross-sectional view of the two dimensional embodiment of this invention as shown in FIG. 7 along line VIII—VIII.
Figure 9:
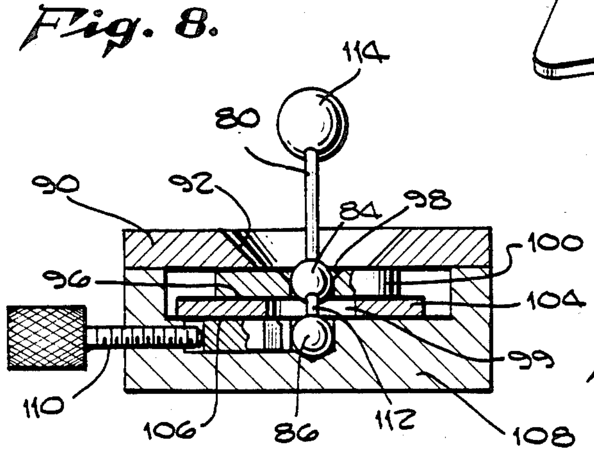
FIG. 9 is a cross-sectional view of the two dimensional embodiment of this invention as shown in FIG. 8 taken along line IX—IX.

Reduction of motion is achieved as revealed in FIGS. 8 and 9. As one grasps the handle ball 114 of the joystick 80 and revolves the stick about the circular path 88, the sphere 84 and driver plate 100 moving against the inclined sides of bore 98, act together as a movable point of application of effort for the joystick 80 against the plate 100. Contact sphere 86 acts as a fulcrum for the assembly 82 to redirect the movement applied at the handle ball 114 to effort against the load driver plate 100. As previously noted, the grease fluid layers 94 and 96 remain the same lower viscosity, while the grease of fluid layer 106 is a higher viscosity so that the principles of Couette flow reduction be applied to the two dimensional apparatus. In this manner, a large movement of the plate 100 induces a reduced motion to the driven plate 104. The distances which the plates 104 and 100 traverse remain linearly proportional provided the ratio of viscosities of fluid layer 106 and layer 96 remain constant due to the Newtonian nature of the fluids which lie between the two plates 104 and 100 and points at which either plate 104 and 100 lie against the housing 90.

Taken together, FIGS. 7–9 illustrate the manner in which a reduction of motion of the driven plate 100 may be achieved.

While the preferred embodiment of the invention is disclosed herein, scope of the invention is not necessarily limited to the preferred embodiment. Many changes are possible and these changes are intended to be in the scope of the disclosure. For example, two sets of plates as shown in FIGS. 4 or 8 may exhibit a similar effect as hereinbefore described when the fluids separating the plates are of the same viscosity, but the spacing between the plates is not the same, such as the diagramatic profile shown in FIG. 2. Consequently, the specific configuration of the disclosed preferred embodiment herein and the construction of the apparatus of this system are merely representative, yet are deemed to afford the best embodiment for purposes of the disclosure and for providing support to the claims which define the scope of the present invention.

What is claimed is:

1. A fluid flow motion reduction apparatus, comprising:

at least three plates including a top movable plate, a bottom stationary plate, and an interleaved driven plate positioned between the top plate and the bottom plate;

a first fluid positioned between said top movable plate and said interleaved driven plate;

a second fluid positioned between said interleaved driven plate and said bottom plate, said second fluid being of a higher viscosity than said first fluid; and means for separating said plates in a substantially frictionless manner;

whereby, when a lateral displacement is imparted on said top movable plate, the interleaved driven plate moves a smaller lateral distance compared to the movement of said top plate.

2. The fluid flow motion reduction apparatus of claim 1, wherein said means for separating said plates are a plurality of steel balls.

3. The fluid flow motion reduction apparatus of claim 1, wherein said plates and said first and second fluids are collectively contained in a fluid-sealed housing.

4. A fluid flow motion reduction apparatus as in claim 1, which includes:

a joystick having a double bearing assembly at one end;

said top movable plate defining a conically formed aperture for receiving a bearing of said double bearing assembly;

an additional plate and an additional fluid layer, said additional fluid layer being of the same viscosity as the first fluid, said additional plate positioned above said top movable plate;

said additional plate forming a socket for receiving said joystick; and, an adjustable screw for locking another bearing of said double bearing assembly into said fluid flow motion reduction apparatus.

5. A fluid flow motion reduction apparatus, comprising:

at least three parallel flat plates, including a movable top plate, an interleaved driven plate, and a stationary bottom plate;

a first fluid positioned and contained between said movable top plate and said interleaved driven plate;

a second fluid positioned and contained between said interleaved driven plate and said stationary bottom plate, said first and second fluids having equal viscosity; and means for positioning said plates along an axis orthogonal to their respective planes, such that the distance between said top plate and said driven plate is substantially greater than the distance between said driven plate and said bottom plate, so that when a lateral force is imparted to said top plate, the driven plate is linearly displaced by a substantially smaller displacement than the linear displacement of said top plate, thereby producing a reduction of lateral displacement.

6. The fluid flow reduction apparatus of claim 5, wherein the means for positioning the plates along an axis orthogonal to their respective planes is a housing which encases the plates and the fluids so as to contain the apparatus in an enclosed structure.

7. A fluid flow motion reduction apparatus, comprising:

a bidirectional movable assembly, including:

at least two flat plates disposed along a central axis orthogonal to their respective parallel planes, said plates including a top movable driving plate and an interleaved driven plate, each of said plates having a central aperture along said axis;

a first Newtonian fluid positioned between said driving plate and said driven plate;

a second Newtonian fluid of a higher viscosity than said first fluid, positioned on the underside of said driven plate; and, a joystick passing through said central apertures of the driving and driven plate, said joystick having a ball joint bearing assembly at its lower end;

said ball joint bearing assembly mounted within a socket, said socket being formed with a lower stationary housing;

wherein, said bidirectionary movable assembly is seated within said housing so that as the joystick is moved, the bearing assembly moves within the socket and the driving and driven plates are caused to move relative to one another so that the driven plate exhibits substantial but proportional reduced displacement when compared to the distance traversed by said driving plate.

8. The fluid flow reduction apparatus of claim 7, further including:

a dual sphere bearing assembly comprising at least a lower contact sphere attached to said joystick and separated from a higher contact sphere by a short portion of the lower part of the joystick so that the driven plate may be moved along at least two different dimensions.

* * * * *